(12) United States Patent
Dahlén et al.

(10) Patent No.: US 10,717,600 B2
(45) Date of Patent: Jul. 21, 2020

(54) SHELF SYSTEM COMPRISING MOVABLE SHELVES

(71) Applicant: KONECRANES GLOBAL CORPORATION, Hyvinkää (FI)

(72) Inventors: Justus Dahlén, Hyvinkää (FI); Tero Kultanen, Lempäälä (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 57 days.

(21) Appl. No.: 15/775,271

(22) PCT Filed: Nov. 9, 2016

(86) PCT No.: PCT/FI2016/050790
§ 371 (c)(1),
(2) Date: May 10, 2018

(87) PCT Pub. No.: WO2017/081368
PCT Pub. Date: May 18, 2017

(65) Prior Publication Data
US 2018/0334327 A1  Nov. 22, 2018

(30) Foreign Application Priority Data
Nov. 13, 2015 (FI) ...................................... 20155838

(51) Int. Cl.
*G06F 7/00* (2006.01)
*B65G 1/137* (2006.01)
(Continued)

(52) U.S. Cl.
CPC ............. *B65G 1/1373* (2013.01); *B65G 1/06* (2013.01); *B65G 1/127* (2013.01); *B65G 1/1378* (2013.01);
(Continued)

(58) Field of Classification Search
None
See application file for complete search history.

(56) References Cited

U.S. PATENT DOCUMENTS 6,042,321 A  3/2000 Labell
6,129,497 A  10/2000 Woodson, III et al.
(Continued)

FOREIGN PATENT DOCUMENTS

DE   23 57 857 A1   5/1975
DE   31 01 661 A1   8/1982
(Continued)

OTHER PUBLICATIONS

Finnish Office Action, issued in Priority Application No. 20155838, dated Jun. 15, 2016.
(Continued)

*Primary Examiner* — Yolanda R Cumbess
(74) *Attorney, Agent, or Firm* — Birch, Stewart, Kolasch & Birch, LLP

(57) ABSTRACT

An arrangement includes at least one shelf system including movable shelves, at least one operating station for collecting items from a movable shelf at the operating station, a first lift for transporting the movable shelves between parking positions of the shelves in the shelf system and the operating station, a second lift for transporting and engaging palletless variable size items. The second lift is capable of docking to the movable shelves of the shelf system for communicating items to the movable shelves or from the movable shelves.

16 Claims, 3 Drawing Sheets

(51) Int. Cl.
*B65G 1/06* (2006.01)
*B65G 1/127* (2006.01)
*B65G 37/00* (2006.01)

(52) U.S. Cl.
CPC ...... *B65G 37/00* (2013.01); *B65G 2203/0208* (2013.01); *B65G 2203/0283* (2013.01)

(56) References Cited

U.S. PATENT DOCUMENTS

| | | | |
|---|---|---|---|
| 9,120,622 B1 | 9/2015 | Elazary et al. | |
| 2005/0224427 A1 | 10/2005 | Hatanaka | |
| 2009/0129902 A1 | 5/2009 | Schafer | |
| 2010/0036521 A1 | 2/2010 | Schäfer | |
| 2014/0044506 A1 | 2/2014 | De Vries | |
| 2014/0056672 A1* | 2/2014 | Mathys | B65G 1/0407 414/277 |
| 2016/0107848 A1* | 4/2016 | Baker | B65G 57/302 414/788.8 |
| 2016/0304281 A1* | 10/2016 | Elazary | B25J 15/06 |

FOREIGN PATENT DOCUMENTS

| | | |
|---|---|---|
| DE | 102007016453 A1 | 10/2008 |
| EP | 0169156 A1 | 1/1986 |
| EP | 2428465 A1 | 3/2012 |
| GB | 1 202 362 | 8/1970 |
| GB | 2 104 470 A | 3/1983 |
| GB | 2 170 793 A | 8/1986 |
| JP | 9-278118 A | 10/1997 |
| WO | WO 2010/100513 A2 | 9/2010 |
| WO | WO 2010/118412 A1 | 10/2010 |

OTHER PUBLICATIONS

Finnish Office Action, issued in Priority Application No. 20155838, dated Oct. 4, 2017.
Finnish Search Report, issued in Priority Application No. 20155838, dated Jun. 15, 2016.
International Search Report, issued in PCT/FI2016/050790, dated Feb. 6, 2017.
Written Opinion of the International Searching Authority, issued in PCT/FI2016/050790, dated Feb. 6, 2017.
Extended European Search Report, dated Jun. 28, 2019, for European Application No. 16863731.2.

* cited by examiner

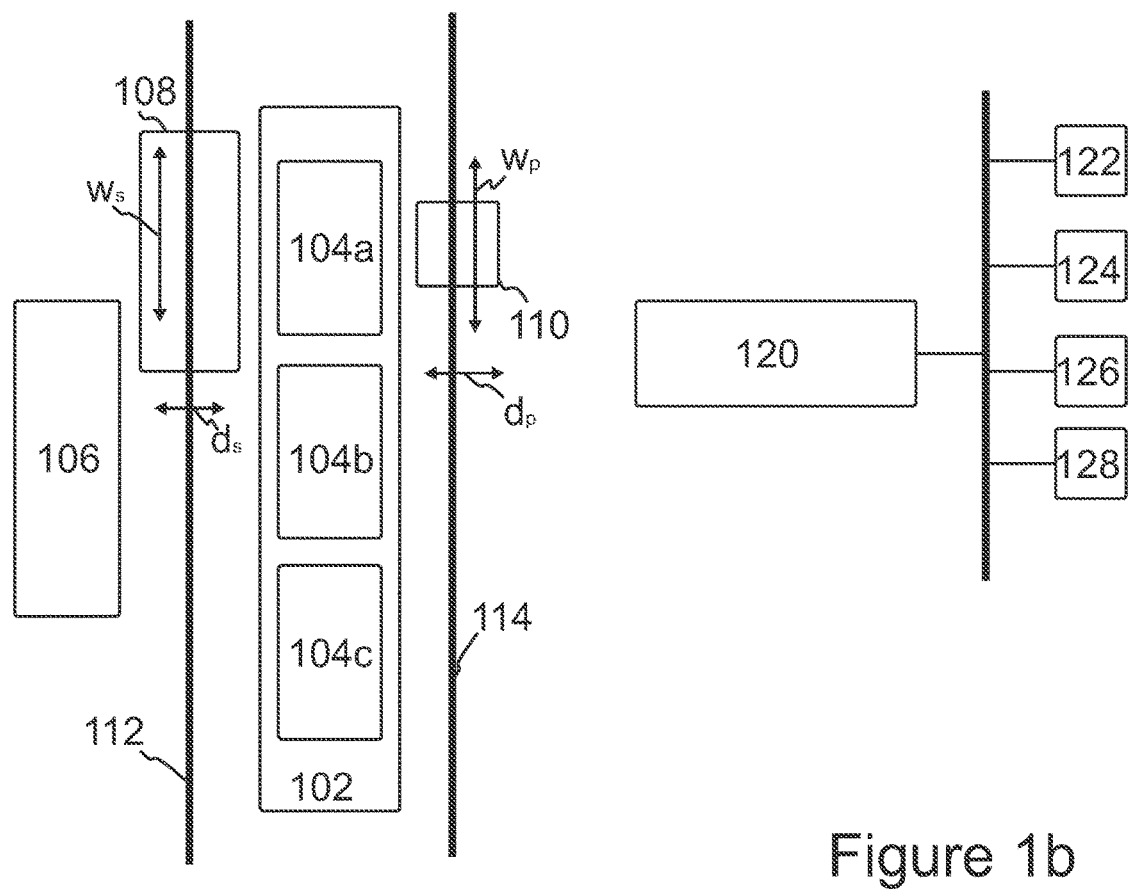
Figure 1a
Figure 1b
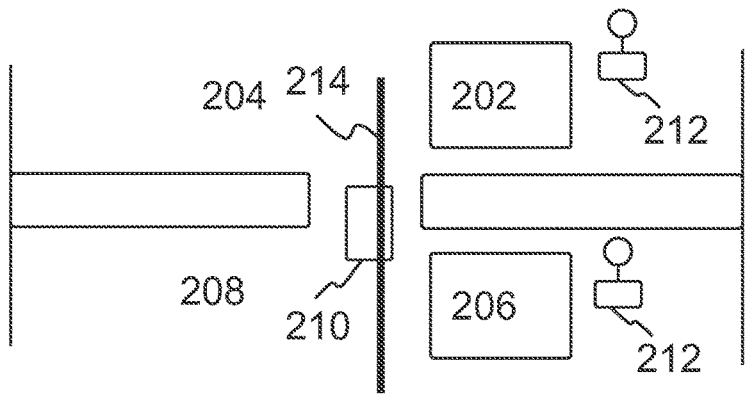
Figure 2
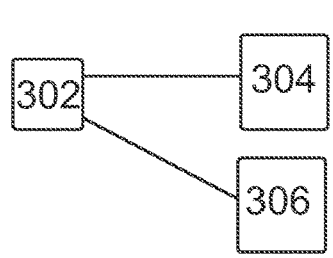
Figure 3a
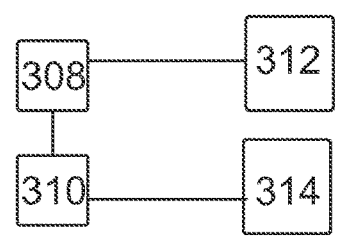
Figure 3b

SHELF SYSTEM COMPRISING MOVABLE SHELVES

FIELD

The invention relates to a shelf system comprising movable shelves and more particularly to a shelf system lift comprising a lift for transporting the movable shelves.

BACKGROUND

A palletless storing system of goods is disclosed in U.S. Pat. No. 6,129,497, where stacked crates are retrieved from the warehouse rack and stacked on another rack. A collecting apparatus moves on rails in the warehouse. This apparatus is adjustable to retrieve and stack crates on different rack levels. There can be many stacks of crates side by side on a rack. The stack is retrieved from the rack by the lift of the stacking apparatus catching the bottom-edge of the lower crate in the stack, so that the whole stack can be lifted and removed by the apparatus. The crates are arranged on the rack so that the lift can be placed under their bottom edge. The crates on the rack are on a smaller base than their bottom part.

With the apparatus it is possible to handle only a certain quantity of crates from a stack of crates. No bearing pallets are needed. Steering of the apparatus takes place from the control centre in the lifting carrier. In the system, the content of the crates is not identified.

Shelf lifts are capable of moving shelves between a parking positions and an operating station. A shelf may be positioned to be supported in the parking position when the shelf is not being transported by a shelf lift. Each shelf can store goods that are needed in a specific operating station at a specific time. However, some of the goods on the shelves may be only seldom needed, so that carrying such goods on the shelves reduces the efficiency of the shelf lift. On the other hand, restocking seldom needed goods to the shelves takes place less often than the goods are needed and typically involves manual work. Floor space required by manual restocking may be relatively large, particularly in large warehouses, having many rows of shelves. Floor space should be reserved for people and equipment, such as trolleys or fork lift trucks.

BRIEF DESCRIPTION OF SOME EMBODIMENTS

The following is a simplified summary of the invention to provide a basic understanding of some aspects of the invention. This summary is not an extensive description of the invention and is not intended to identify the important/critical elements of the invention or to define the scope of the invention. Its only intention is to present some concepts of the invention in a simplified form as an introduction to the more detailed description that follows.

It is an object of the present invention to develop a solution to alleviate the above-mentioned drawbacks. The object of the invention is achieved by an arrangement, a method and a computer program product that are characterised by the attached independent claims. Preferred embodiments of the invention are disclosed in the dependent claims.

Some embodiments provide stocking palletless items to a movable shelf and/or collecting palletless items from a movable shelf.

BRIEF DESCRIPTION OF THE DRAWINGS

In the following the invention will be described in greater detail by means of preferred embodiments with reference to the attached drawings, in which FIG. 1a illustrates an arrangement according to an embodiment;

FIG. 1b illustrates an arrangement comprising a warehouse management system according to an embodiment;

FIG. 2 illustrates shelf systems in different floors in an arrangement according to an embodiment;

FIGS. 3a and 3b illustrate controlling arrangements by warehouse management systems according to embodiments;

DETAILED DESCRIPTION

Figure 4:
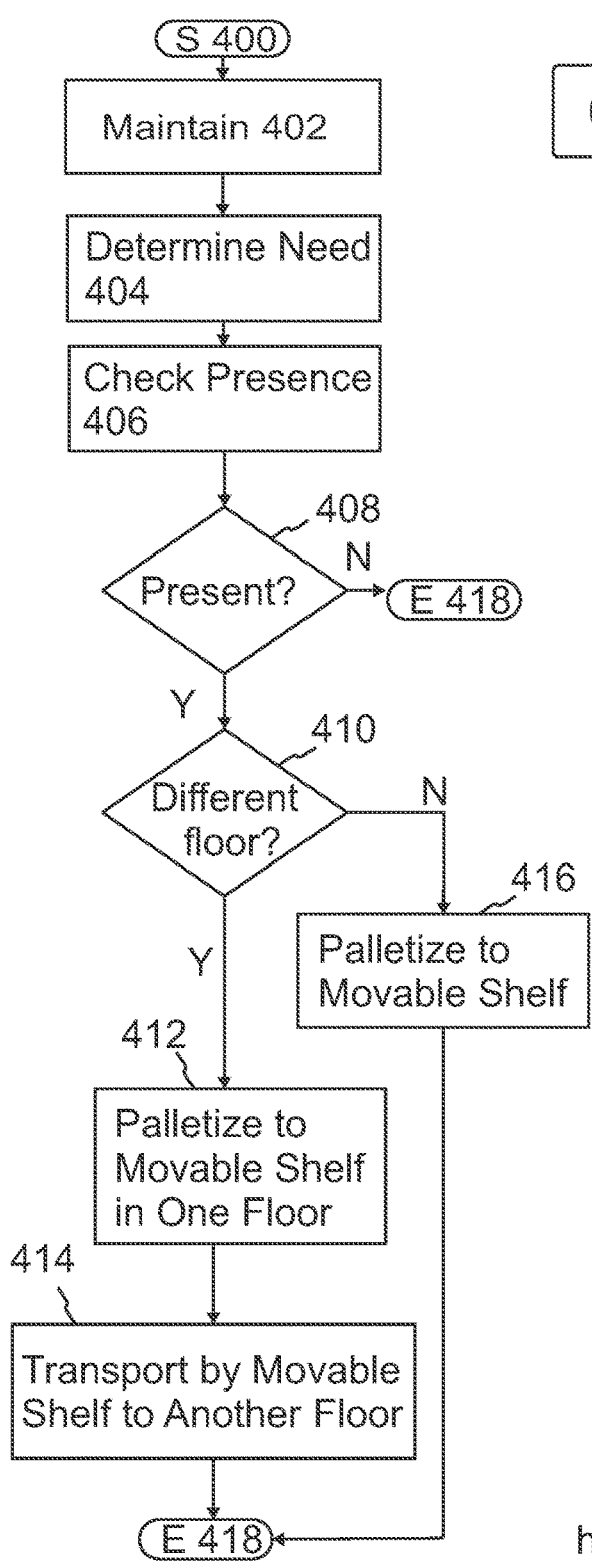
FIG. 4 illustrates controlling an arrangement according to an embodiment.

FIG. 1a illustrates an arrangement according to an embodiment from above. The arrangement comprises at least one shelf system 102 comprising movable shelves 104a, 140b, 104c, at least one operating station 106 for collecting items from a movable shelf at the operating station and a lift 108 for transporting the movable shelves between parking positions of the shelves in the shelf system and the operating station. This lift 108 may be referred to as a shelf lift. The arrangement further comprises another lift 110 for transporting and engaging palletless variable size items. This lift may be referred to as a palletless lift. The palletless lift is capable of docking to the movable shelves 104a, 104b, 104c of the shelf system for transferring items to and from the shelves.

The items comprise palletized items and palletless items. The palletized items refer to items on a movable shelf of the shelf system. The palletless items refer to variable size items that are transported by the palletless lift to and/or from a movable shelf without a shelf or other structure serving as a pallet. Accordingly, palletless items may be moved to the movable shelves by the palletless lift. The arrangement stores the items in the shelf system and transports the palletized items on the movable shelves to the operating station by the shelf lift.

The shelf system comprises a plurality of shelves, where items are stored. The shelves are supported on top of each other and there are several shelves in parallel. The shelf system includes support structures such as vertical and horizontal beams for supporting the shelves in the shelf system.

The movable shelf is transferred between its parking position in the shelf system and the operating station by the shelf lift. The parking position is capable of receiving the movable shelf from the shelf lift and supporting the movable shelf in the parking position. In FIG. 1a, the movable shelves are at their parking positions.

The shelf lift 108 moves between the parking positions and the movable shelves in the shelf system. The shelf lift has docking means for attaching to the movable shelves. The docking means are operatively connected to guide 112 of the shelf lift. The guide moves the docking means for attaching to the movable shelves and transferring the shelves between the parking positions and the operating station. Examples of the guide comprise a hoisting machinery for vertical movement of the shelf lift, a rail for horizontal movement of the shelf lift in the width direction of the shelves '$w_s$' and a unit for horizontal movement towards a shelf in the depth direction of the shelves '$d_s$'.

The palletless lift comprises a grabber for attaching to palletless items. An example of the grabber is described with FIGS. 7a and 7b. The palletless lift moves between the shelves in the shelf system and an operating station 106. The operating station of the palletless lift may be the same as the operating station of the shelf lift. However, the arrangement may comprise a separate operating station for the palletless lift such that disturbances to the operation of the shelf lift in transporting shelves to the operating station may be avoided. In this way, the palletless lift can stock palletless items from the operating station to the shelves.

The palletless lift has docking means for engaging to shelves in the shelf system. The docking means allow items to be moved from the palletless lift to the shelf and from the shelf to the palletless lift. The palletless lift has guide 114 for moving the palletless lift between the shelves and the operating station. The docking means may be operatively connected to guide the palletless lift. Examples of the guide comprise a hoisting machinery for vertical movement of the palletless lift, a rail for horizontal movement of the palletless lift in the width direction of the shelves '$w_p$' and a unit for horizontal movement towards a shelf in the depth direction of the shelves '$d_r$'. An example of the unit for horizontal movement is described in more detail with FIGS. 6a and 6b. It should be appreciated that since the palletless lift transports items that are not palletized, the palletless lift may operate with both fixed shelves and movable shelves in the shelf system. However, it may be preferred to operate the palletless lift with movable shelves for palletizing items on the movable shelves for transportation to the operating.

It should be appreciated that the shelves in the shelf system may be movable or fixed. However, at least one of the shelves should be movable for serving the operating station 106 with palletized items on a shelf. It is also possible that all the shelves 104a, 104b, 104c are movable, whereby the movable shelf at the operating station may be changed by the shelf lift 108 to another movable shelf from the shelf system. The movable shelves may have the same palletized items, so that the movable shelf at the operating station may be changed by the shelf lift 108 to another movable shelf in order to prevent outage of one or more items at the operating station. On the other hand, the movable shelves may have at least partly different palletized items, so that the movable shelves may serve the operating station in different work phases performed at the operating station. Accordingly, the palletized items in the movable shelves may serve different work phases performed at the operating station.

The operating station may have a parking position to receive the movable shelf at the operating station. The operating station allows personnel to collect items from the movable shelf located at the operating station. The arrangement may comprise more than one operating station. At least one operating station may serve collecting items from a movable shelf and at least one operating station may serve feeding palletless items for transportation by the palletless lift to the shelf system. Personnel may be present at the operating stations for feeding and collecting the items.

FIG. 1b illustrates an arrangement comprising a Warehouse Management System (WMS) 120 according to an embodiment. The warehouse management system is connected to units of the arrangement comprising a palletless lift 122, a shelf lift 124, operating station 126 and a shelf system 128, examples of which are described above with FIG. 1a. It should be appreciated that there may be any number of units of each kind.

The connection between the WMS and the palletless lift, the shelf lift and the operating station and the shelf system may be provided by a communications bus, for example. However, dedicated connections may be implemented between the WMS and each unit. The communications bus may be an IP based Ethernet network or an industrial bus. The connection provides transfer of information from the units for maintaining information of items stored in the shelf system in the WMS and for controlling the units. The information of items stored in the shelf system may comprise, for each item, information identifying the item and quantity and a location in the shelf system. Additionally, information of the supplier may be stored for each item. Examples of the information of the supplier may comprise name and contact information, such as an email address. Information of palletized items stored in the shelf system may be obtained from the movable shelves, the shelf lift and/or from the operating station. Information of palletless items stored in the shelf system may be obtained from the palletless lift or the operating station. The shelf system, operating station, movable shelves, shelf lift and palletless lift may comprise sensors that may detect receiving an item, collecting an item, a position of the palletless lift in the shelf system and a position of the shelf lift. Examples of the sensors comprise cameras, weight sensors and optical sensors. The sensors generate information used to determine information of the items stored in the shelf system.

The WMS may maintain a task list that may define items needed at a specific operating station at a given time and/or in a specific work performed by personnel at the operating station. The WMS controls the palletless lift and the shelf lift as needed. The shelf lift is controlled for transporting items on the movable shelves to and from the operating station or between shelf systems on different floors. The palletless lift is also controlled for transporting items from the movable shelves to the operating station or to a shelf system on a different floor. It should be appreciated that although only one WMS is illustrated in FIG. 1b, further WMSs may be connected with the one or more items described in FIG. 1b, for example, using the described connections. Controlling an arrangement by more than one WMS is described in more detail in FIGS. 3a and 3b.

FIG. 2 illustrates shelf systems on different floors in an arrangement according to an embodiment. At least one shelf system 202 is installed to a higher floor 204 and at least one shelf system 206 is installed to a lower floor 208. A shelf lift 210 is movable between the shelf system in the lower floor and the higher floor. The shelf systems may be shelf systems in arrangements according to FIG. 1a, where the shelf lift is capable of moving between different floors and between the shelf system and the operating station in each floor. The floors are connected by a hoistway comprising a hoist 214, for example hoisting machinery and ropes, for moving the shelf lift between the floors in the hoistway. On the other hand, the shelf systems on different floors may be connected by one shelf lift and the arrangements in each floor have a further shelf lift (not shown) for transporting movable shelves between parking positions of the shelves in the shelf system and the operating station.

In an embodiment, the shelf systems on different floors have parking positions for one or more shelves transported by the shelf lift. The shelf lift may transport a movable shelf from a parking position on one floor to a parking position on another floor. The shelf systems on different floors may have more than one parking positions for the shelves transported by the shelf lift such that a plurality of shelves from one floor may be transported to another floor.

In an embodiment, the arrangement comprising shelf systems on different floors has one or more palletless lifts 212 for transporting and engaging palletless variable size items in at least one of the shelf systems or both of the shelf systems. The palletless lift is capable of docking to the movable shelves of the shelf system for transferring palletless items to the movable shelves or from the movable shelves.

FIGS. 3a and 3b illustrate controlling arrangements by warehouse management systems according to embodiments. The arrangements may comprise one of the arrangements described above. FIG. 3a illustrates controlling a shelf lift 304 and a palletless lift 306 by a single Warehouse Management System (WMS) 302. Accordingly, the WMS controls both the shelf lift and the palletless lift. FIG. 3b illustrates controlling a shelf lift 312 and a palletless lift 314 by a plurality of WMSs 308, 310. Accordingly, the shelf lift is controlled by one WMS 308 and the palletless lift is controlled by another WMS 310. In FIG. 3b, at least one of the WMSs may be capable of operating as a master to the other WMS. The WMSs that are not masters may be referred to as slaves. Accordingly, the WMSs may have a master-slave relationship, where the slave WMS operates under control of the master WMS. The master WMS issues commands to the slave WMS. The commands identify one or more items for transportation to a specific location, for example an operating station, a movable shelf or a partition on the movable shelf.

In FIGS. 3a and 3b, the WMSs are capable of maintaining information of items stored in a shelf system and determining a need for one or more items in a shelf system or at an operating station. The arrangement may comprise shelf systems on different floors and the WMS may be capable of determining a need for one or more items on one of the floors. The items may be needed on the same floor or on another floor.

In an embodiment, the master-slave relationship between the WMSs may be fixed. Accordingly, one of the WMSs is set as a master and one of the WMSs is set as a slave. The master WMS and the slave WMS may be connected such that the master WMS causes the slave WMS to transport items in the arrangement. The slave WMS and master WMS may be connected by a management interface which allows the master WMS to issue commands for execution by the slave WMS. The slave WMS may provide information of items stored in the shelf system via the management interface.

In an embodiment, the master-slave relationship between the WMSs may be negotiated. The WMSs may be connected for negotiating the master-slave relationship, for issuing command from the master WMS to the slave WMS and for exchanging information of items stored in the shelf system. The master WMS and slave WMS may be determined by a protocol of negotiating the master and slave. The protocol may be implemented in both the master and the slave.

In one example of the protocol, a WMS is set as a master by a request issued by the WMS to one or more other WMSs. The request is a request to the slave WMSs to transport an item. In this way, the WMS issuing the request is assumed as the master. In another example of the protocol, a WMS requests a master token from the slaves. When a WMS accepts the request for the master token, the WMS sends the master token as response, whereby the receiver of the master token is set as the master and the originator of the master token is set as a slave.

FIG. 4 illustrates controlling an arrangement according to an embodiment. The arrangement may be one of the arrangements described above. The method may start 400, when a palletless lift is operational and capable of transporting and engaging palletless variable size items.

Information of items stored in a shelf system is maintained 402. The arrangement may comprise a plurality of shelf systems. The shelf systems may be on different floors. The information of the items may be maintained for example by a WMS described with FIG. 1b.

A need for one or more items is determined 404. The items are identified by name and location and where the item is needed. The items may be needed in the arrangement, for example, at an operating station, a movable shelf, palletless lift and/or a shelf lift. A quantity of needed items may also be determined. The quantity may be expressed by a count of items or by weight, for example. In one example, the need may be determined on the basis of a task list of the WMS or a user ordering an item to an operating station. In an embodiment, the need is a need for palletizing one or more items on a movable shelf. In an embodiment, the need is a need for one or more items in a shelf system in a specific floor or at an operating station.

In an embodiment, the need for palletized items on the movable shelf is determined 404 to meet a demand for items, wherein the needed items comprise frequently needed items and infrequently needed items and the demand for frequently needed items is maintained over a time period during which the demand for infrequently needed items is changed. At least part of the infrequently needed items currently palletized on a movable shelf are changed after the time period has elapsed. In this way, the palletized items on the movable shelf may be varied according to the demand. The frequently needed items may be needed constantly, for example daily, whereby the demand for frequently needed items may be relatively constant. The needed items may be defined by a task list maintained by the WMS.

The infrequently needed palletized items on the movable shelf may be changed by controlling a palletless lift to transport at least some or all of the infrequently needed items currently palletized on the movable shelf to one or more other shelves in the shelf system and palletizing new infrequently needed items from the shelf system and/or received from an operating station to the movable shelf. The palletized items may additionally comprise frequently needed items to restock the movable shelf. The needed items may be needed by personnel working at the operating station, whereby changing the infrequently palletized items on the movable shelf allows adaptation according to the work phases performed by the personnel. The time period may be, for example, one day such that the infrequently needed items are changed daily, for example at night, to prepare the movable shelf for the next work day.

The shelf system is checked 406 for the presence of the needed items. The presence of the needed items may be checked from the maintained 402 information. The checking may comprise comparing the needed items determined in 404 to the maintained 402 information. The presence of the needed items may be determined on the basis of information, for example name, identifying the needed items. Additional requirements for the presence may be that the maintained information comprises the needed quantity of the needed items. In an embodiment, the presence of the needed items may be checked in the shelf systems located on different floors. Accordingly, the maintained information comprises items stored to the shelf systems on different floors and the needed items are determined to be present even if they are on a different floor than the location where the items are needed.

If the needed items are present in the shelf system, the method proceeds to 410. The needed items are considered present in the shelf system when the items are stored in the shelf system. The items may be present when the items are palletized on a movable shelf, for example. If the needed items are not present in the shelf system, the method may end 418.

In an embodiment, an e-mail order to the supplier for the needed items is sent if the needed items are not present. Information of the supplier comprising, for example, name and contact information such as an email address, may be associated to the information of the item maintained by the WMS.

If the needed items are present on a different floor than the floor where the items are needed, the method proceeds to transporting 414 the needed items by a shelf lift to the floor where the items are needed. The transporting may comprise palletizing 412 the needed items from the shelf system to a movable shelf of a shelf lift and transporting 414 the needed items by the shelf lift to the floor where the items are needed. The needed items may be palletized on the movable shelf by a palletless lift. It should be appreciated that the items may be palletized on the movable shelf before the need for items has occurred, whereby it may be sufficient to determine that the items are on the movable shelf that may be transported to another floor.

If the needed items are present on the same floor where the items are needed, the method continues to palletizing 416 the needed items from the shelf system to a movable shelf of a shelf lift for transportation the items to where the items are needed. The needed items may be palletized on the movable shelf by a palletless lift. It should be appreciated that the items may be palletized on the movable shelf before the need for items has occurred, whereby it may be sufficient to determine that the items are on the movable shelf that may be transported to the needed location.

The method may end 418 after the needed items are palletized on the movable shelf. Thanks to the items being palletized by the palletless lift on the movable shelf operated by the shelf lift, items may be stocked as needed to avoid outages of items on the movable shelves.

Figure 5:
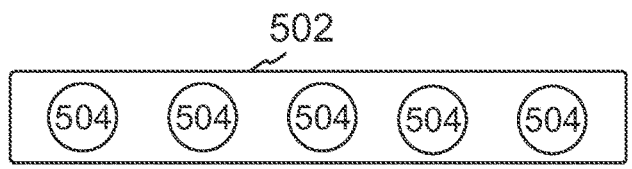
FIG. 5 illustrates guides in a shelf system according to an embodiment.

FIG. 5 illustrates guides 504 in a shelf system according to an embodiment. The guides 504 facilitate docking a palletless lift to a movable shelf. The guides are illustrated in a structure 502. The structure may be part of a movable shelf, for example, an edge of the shelf, or the structure may be a fixed structure at the parking position of the shelf system. When the guides are fixed to the parking positions, the guides are used for positioning the palletless lift even if the movable shelf is not present at the parking position. In this way, freedom is provided to the positioning of the palletless lift with respect to the shelf system. The palletless lift may have one or more sensors that allow detection of the guides and positioning the palletless lift to the guides. The guides may be arranged in the width direction of the movable shelf.

The guides may be holes 504 in the structure such that protrusions from the lift enter the guides for docking the lift to the movable shelf. The holes may be through-holes or recesses. The protrusion extends in the depth direction of the movable shelf and are received within the holes. Accordingly, the holes open towards the protrusions. After the protrusions are received in the holes, the palletless lift may be docked to the movable shelf.

Figure 6A:
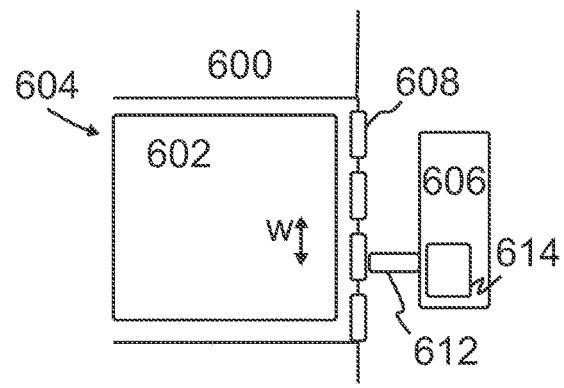
FIGS. 6a and 6b illustrate positions of guides in a shelf system according to an embodiment.
Figure 6B:
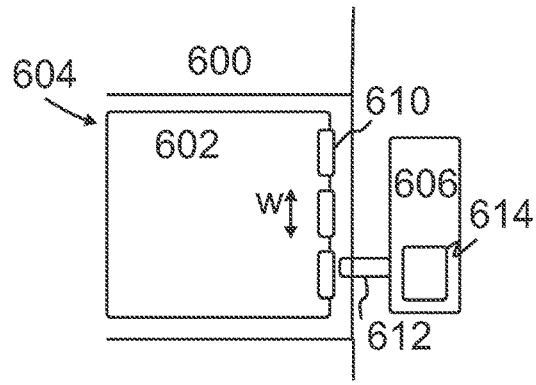

FIGS. 6a and 6b illustrate positions of guides 608, 610 in a shelf system 600 according to embodiments. The shelf system has at least one movable shelf 602 and one or more parking positions 604 for the movable shelves. The guides are arranged in the width direction 'w' of the movable shelf. In FIGS. 6a and 6b, the movable shelf is parked in the parking position such that a palletless item in a palletless lift 606 can be moved by sliding from the palletless lift to the movable shelf docked at the parking position or vice versa. In FIG. 6a, the shelf system comprises guides 608 fixed at the parking position. The guides may be fixed to a horizontal beam in the shelf system, for example. In FIG. 6b, guides 610 are arranged at the movable shelf. In the movable shelf, the guides are arranged at one or more edges of the movable shelf. In FIGS. 6 and 6b, the guides are preferably arranged in the shelf system to a side where the palletless lift is operating palletless items.

The palletless lift has one or more protrusions 612 for docking the lift to the movable shelf by the protrusions entering the guides. The protrusions are extensible and retractable in the protruding direction such that they are extended for docking the palletless to the movable shelf and retracted for undocking the palletless lift away from the movable shelf. The palletless lift has a unit for horizontal movement 614 of the lift for moving the palletless lift towards the movable shelf and to a position for transferring palletless items from the lift to the movable shelf at the parking position or at the operating station or for transferring palletless items from the parking position of a movable shelf to the palletless lift. The unit for horizontal movement 614 actuates after the protrusions have engaged the guides. When the protrusions are engaged to the guides, the palletless lift is maintained at the parking position, whereby the unit for horizontal movement causes the palletless lift to move the palletless lift towards the movable shelf. In this way, a gap between the palletless lift and the movable shelf is decreased for facilitating transferring of palletless items between the lift and the palletless lift. In one example, the unit for horizontal movement comprises an electric motor connected to the protrusions for driving the protrusions towards the guides and away from the guides, and an electric motor for driving the palletless lift towards the movable shelf and away from the movable shelf. A single electric motor may be sufficient for driving both the protrusions and the palletless lift.

In an embodiment, the guides comprise holes arranged in a width direction of the movable shelves and the palletless lift has protrusions for penetrating and engaging to the holes and a unit for horizontal movement of the lift towards the shelves. The unit for horizontal movement 614 is caused to actuate after the protrusions have engaged the holes.

Figures 7A, 7B:
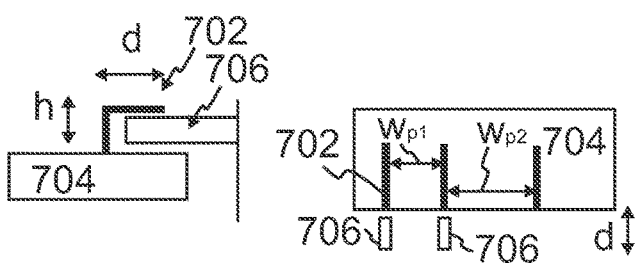
FIGS. 7a and 7b illustrate partitions for palletizing palletless variable size items to a movable shelf according to embodiments.

FIGS. 7a and 7b illustrate partitions 702 for palletizing palletless variable size items to a movable shelf 704 according to embodiments. The movable shelf may be a shelf in a shelf system in an arrangement according to an embodiment. FIG. 7a is a view from one end of the movable shelf. The width direction of the movable shelf is into the page. FIG. 7b is a view from above the movable shelf. The movable shelf comprises partitions 702. The partitions 702 are installed to one or more movable shelves 704 in the shelf system for partitioning the movable shelves and receiving a grabber 706 from the lift for transporting and engaging palletless items. The partitions extend in the depth 'd' direction of the movable shelf such that a pair of partitions form a space between the partitions in the width direction '$w_{p1}$', '$w_{p2}$' of the movable shelf. In this way, the partitions prevent movement of items in the width direction of the movable shelf and reserve space for the grabber of the palletless lift. The partitions may be at least partly elevated to a height 'h' from an upper surface of the movable shelf and open to the side of the movable shelf where the palletless lift operates so that the grabber is received between the partitions and the upper surface of the movable shelf. The partitions are of sufficient width such that the grabber enters in the depth direction of the movable shelf between the partitions and the movable shelf. In this way, the partitions 702 provide space that is reserved for the grabber on the movable shelf on both sides of the item located in the partition.

A grabber 706 of the palletless lift has gripping members for transporting and engaging palletless variable size items. The gripping members may be movable in the width direction of the movable shelf '$w_{p1}$', '$w_{p2}$', for engaging an item between the gripping members. The gripping members may be movable in the depth 'd' direction of the movable shelf for moving an item between the palletless lift and the movable shelf or from the movable shelf to the palletless lift. When an item is engaged between the gripping members, the item is engaged by the gripping members pressing the item from opposite sides of the item. When the item is not engaged between the gripping members, the gripping members are separated in the width direction '$w_{p1}$', '$w_{p2}$', of the movable shelf. The separation of the gripping members in the width direction is defined by the width of the '$w_{p1}$', '$w_{p2}$' partition where the palletless lift is parked. In this way, the gripping members are received under the partitions, between the partitions and the movable shelf, according to the width of each partition.

An embodiment concerns operating a palletless lift to transport palletless items to and/from a movable shelf. The palletless lift may be operated under control of a warehouse management system.

Transporting a palletless item from the movable shelf includes collecting the item by the palletless lift from the movable shelf. The movable shelf has partitions. The palletless lift is docked to the movable shelf guided by guides after which the gripping members extend from the palletless lift towards the movable shelf and are received under the partitions. The gripping members engage the item in the partition by moving the gripping members towards each other in the width direction of the movable shelf. The gripping members engage the items and exert a force to the item sufficient to hold the item between the gripping members. Then the grabber moves back and pulls the item to the palletless lift.

Transporting a palletless item from the movable shelf includes stocking the palletless item by a palletless lift to the movable shelf. The movable shelf has partitions. The palletless lift is docked to the movable shelf guided by guides. The gripping members engages the palletless item carried in the palletless lift. The gripping members extend from the palletless lift towards the movable shelf and push the item from the palletless lift on the movable shelf. After the palletless item is on the movable shelf, the gripping members are moved apart in the width direction of the movable shelf and under the partitions. Then, the gripping members retract back to the palletless lift.

Figure 8:
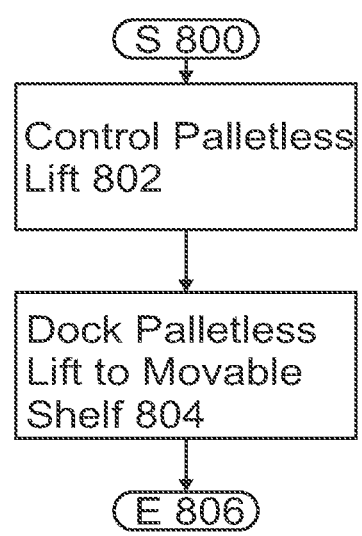
FIG. 8 illustrates a method according to an embodiment.

FIG. 8 illustrates a method according to an embodiment. The embodiment may be performed in an arrangement described above for example by a warehouse management system. The method provides stocking palletless items to a movable shelf and/or collecting palletless items from the movable shelf. The method may start 800 when a palletless lift is operational and capable of transporting and engaging palletless variable size items. The items are located on a movable shelf of the shelf system or at an operating station where the items are engaged for transportation by the palletless lift.

The palletless lift may be controlled 802 for transporting and engaging palletless variable size items. The palletless items are engaged and transported by the palletless lift between an operating station and a shelf of the shelf system, and between shelves of the shelf system. Shelves and shelf systems may be located on different floors, whereby the palletless items are palletized to a movable shelf movable between the different floors by a shelf lift.

The palletless lift is docked 804 to a movable shelf of the shelf system. The shelf system has guides for positioning the palletless lift to a parking position of the movable shelf. The palletless lift comprises protrusions for engaging the guides and a unit for horizontal movement that actuates after the protrusions have engaged the guides. Actuating the unit for horizontal movement causes the movement of the palletless lift towards the movable shelf.

When the palletless lift is docked to the movable shelf, items are stocked from the palletless lift to the movable shelf and/or collected from the movable shelf to the palletless lift. Accordingly, items are transferred between the movable shelf and the palletless lift docked to the movable shelf.

The method ends 806 after transfer of items to/from the palletless lift is to provided and stocking palletless items to a movable shelf and/or collecting palletless items from the movable shelf is facilitated.

In an embodiment there is provided a computer program comprising computer program code for execution on a computer to cause a method according to an embodiment. The computer program may be embodied on a computer-readable storage medium.

In an embodiment there is provided a computer program product for a computer, comprising a computer program according to an embodiment.

In an embodiment, an apparatus or arrangement, for example, a warehouse management system described in an embodiment, may comprise at least one processor, memory and a computer program code that form processing means or a computer for carrying out an embodiment.

Embodiments as described may be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer-readable storage medium. The computer-readable storage medium may be a computer program distribution medium readable by a computer or a processor. The computer-readable storage medium may be, for example but not limited to, a record medium, computer memory, read-only memory, electrical carrier signal, telecommunications signal, and software distribution package, for example.

The techniques described herein may be implemented by various means so that an arrangement, warehouse management system or a unit of the arrangement or the warehouse management system implementing one or more functions of an arrangement or warehouse management system described with an embodiment comprises not only prior art means, but also means for implementing the one or more functions of a corresponding apparatus or unit described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. In one example implementation, an arrangement or warehouse management system, or a unit of the arrangement or warehouse management system may be a software application that is executable on a platform. The platform may be a software and/or hardware platform capable of executing software applications. A computer may be an example of a hardware platform. A software platform may comprise, for example an operating system. A combination of hardware and software platform may be formed by an operating system that is executable on a computer. Examples of the software platforms include operating systems, for example OSX from Apple Inc., and Windows Vista from Microsoft.

For a firmware or software, implementation can be through modules (e.g., procedures, functions, and so on) that perform the functions described herein. The computer program codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

It will be obvious to a person skilled in the art that, as the technology advances, the inventive concept can be implemented in various ways. The invention and its embodiments are not limited to the examples described above but may vary within the scope of the claims.

The invention claimed is:

1. An arrangement comprising:
   at least one shelf system comprising a plurality of movable shelves;
   at least one operating station for collecting items from at least one of the movable shelves;
   a first lift for transporting the movable shelves between parking positions in the shelf system and the operating station; and
   a second lift for transporting and engaging palletless variable size items to or from the movable shelves or the operating station, the second lift engaging and transporting the variable size palletless items without the shelf during transport;
   wherein the second lift is capable of docking to the plurality of movable shelves for transferring the palletless variable size items to or from the movable shelves,
   wherein the palletless items are palletized when the second lift moves the palletless items to the movable shelves, and
   wherein the movable shelves comprising the palletized items are transported together with the palletized items to move the palletized items as a group while supported by the shelves.

2. The arrangement according to claim 1, further comprising a plurality of shelf systems in different floors, wherein the first lift is capable of transporting shelves between the shelf systems on different floors.

3. The arrangement according to claim 1, further comprising a third lift for transporting and engaging palletless variable size items,
   wherein the third lift is capable of docking to the movable shelves for transferring items to or from the movable shelves, wherein the second lift and the third lift are in different floors.

4. The arrangement according to claim 3, further comprising at least one warehouse management system capable of maintaining information of items stored in the shelf systems on different floors and for determining a need for one or more items in one of the floors,
   wherein said warehouse management system is configured to check the floors for the presence of the needed items, and
   wherein if the needed items are present in at least one of the other floors, to control the second lift to retrieve the needed palletless variable size items located on the other floor, and to palletize the needed items to a movable shelf for transportation on the movable shelf by the first lift,
   wherein the first lift connects the shelf systems to the needed floor.

5. The arrangement according to claim 1, further comprising at least one warehouse management system capable of maintaining information of items stored in the shelf system and for determining a need for one or more items to be palletized on at least one movable shelf,
   wherein said warehouse management system is configured to check the shelf system for the presence of the needed items and if the needed items are present in the shelf system, to control the second lift for retrieving the needed palletless variable size items in the shelf system to palletize the needed items from a shelf in the shelf system to the at least one movable shelf.

6. The arrangement according to claim 1, wherein a need for items palletized on the movable shelf is configured to meet a demand for items,
   wherein the needed items comprise frequently needed items and infrequently needed items, and
   wherein the demand for frequently needed items is maintained over a time period and the demand for infrequently needed items changes over a period of time; wherein at least part of the infrequently needed items currently palletized on a movable shelf changes after the time period has elapsed.

7. The arrangement according to claim 1, further comprising a plurality of warehouse management systems comprising:
   at least one first warehouse management system for managing palletless variable size items; and
   at least one second warehouse management system for managing palletized items,
   wherein the first warehouse management system is capable of operating as master to the second warehouse management system, when items are transported between shelf systems on different floors by the first lift.

8. The arrangement according to claim 1, further comprising a plurality of warehouse management systems comprising:
   at least one first warehouse management system for managing palletless variable size items; and
   at least one second warehouse management system for managing palletized items,
   wherein the second warehouse management system is capable of operating as master to the first warehouse management system, when items are needed to be palletized to a movable shelf to be delivered to the operating station on the movable shelf.

9. The arrangement according to claim 1, wherein the second lift for transporting the palletless variable size items is capable of docking to a movable shelf in at least one parking position of the movable shelves such that an item on the second lift is moved by sliding the item from the second lift to the movable shelf docked at the parking position or vice versa.

10. The arrangement according to claim 1, further comprising one or more guides for docking the second lift for transporting the palletless and variable size items to a movable shelf by a horizontal movement of the second lift.

11. The arrangement according to claim 10, wherein the guides are arranged on at least one edge of the movable shelves.

12. The arrangement according to claim 10, wherein the guides are fixed at the parking positions in the self system, said parking positions are capable of receiving a movable shelf for parking.

13. The arrangement according to claim 10, wherein the one or more guides comprise holes arranged in a width direction of the movable shelves and the second lift for engaging the palletless and variable size items has protrusions for penetrating and engaging to the holes, the second lift further comprising a unit for horizontal movement towards the shelves,
wherein said unit for horizontal movement is configured to actuate after the protrusions have engaged the holes.

14. The arrangement according to claim 1, further comprising one or more movable shelves having partitions for partitioning the movable shelves and for receiving gripping members from the second lift for transporting and engaging the palletless variable size items.

15. A method for use in an arrangement comprising at least one shelf system;
the shelf system comprising a plurality of movable shelves;
at least one operating station for collecting items from at least one movable shelf;
a first lift for transporting the movable shelves between parking positions of the shelves of the shelf system and the operating station;
a second lift for transporting and engaging palletless variable size items, wherein the method comprises:
docking the second lift to the movable shelves of the shelf system for transferring the palletless variable size items to or from the movable shelves,
wherein the palletless items are palletized when the second lift moves the palletless items to the movable shelves, wherein the movable shelves comprising the palletized items are transported together with the palletized items to move the palletized items as a group while supported by the shelves.

16. A computer program product embodied on a non-transitory computer readable medium and comprising computer program code that when executed in a computer connected to control an arrangement comprising at least one shelf system;
the shelf system comprising comprising a plurality of movable shelves,
an operating station for collecting items from a movable shelf at the operating station, and
a first lift for transporting the movable shelves between parking positions of the shelf system and the operating station; and a second lift for transporting and engaging palletless variable size items,
wherein the computer program controls the second lift to:
dock the second lift to the movable shelves of the shelf system for transferring the palletless variable size items to or from the movable shelves; wherein the movable shelves comprising the palletized items are transported together with the palletized items to move the palletized items as a group while supported by the shelves.

* * * * *